No. 820,901. PATENTED MAY 15, 1906.
J. L. ARIZTIA.
MERRY-GO-ROUND.
APPLICATION FILED MAY 9, 1905.

WITNESSES:
G. M. Callaghan
Amos W. Hart

INVENTOR
JUAN L. ARIZTIA
BY Munn & Co.
ATTORNEYS

No. 820,901. PATENTED MAY 15, 1906.
J. L. ARIZTIA.
MERRY-GO-ROUND.
APPLICATION FILED MAY 9, 1905.
2 SHEETS—SHEET 2.
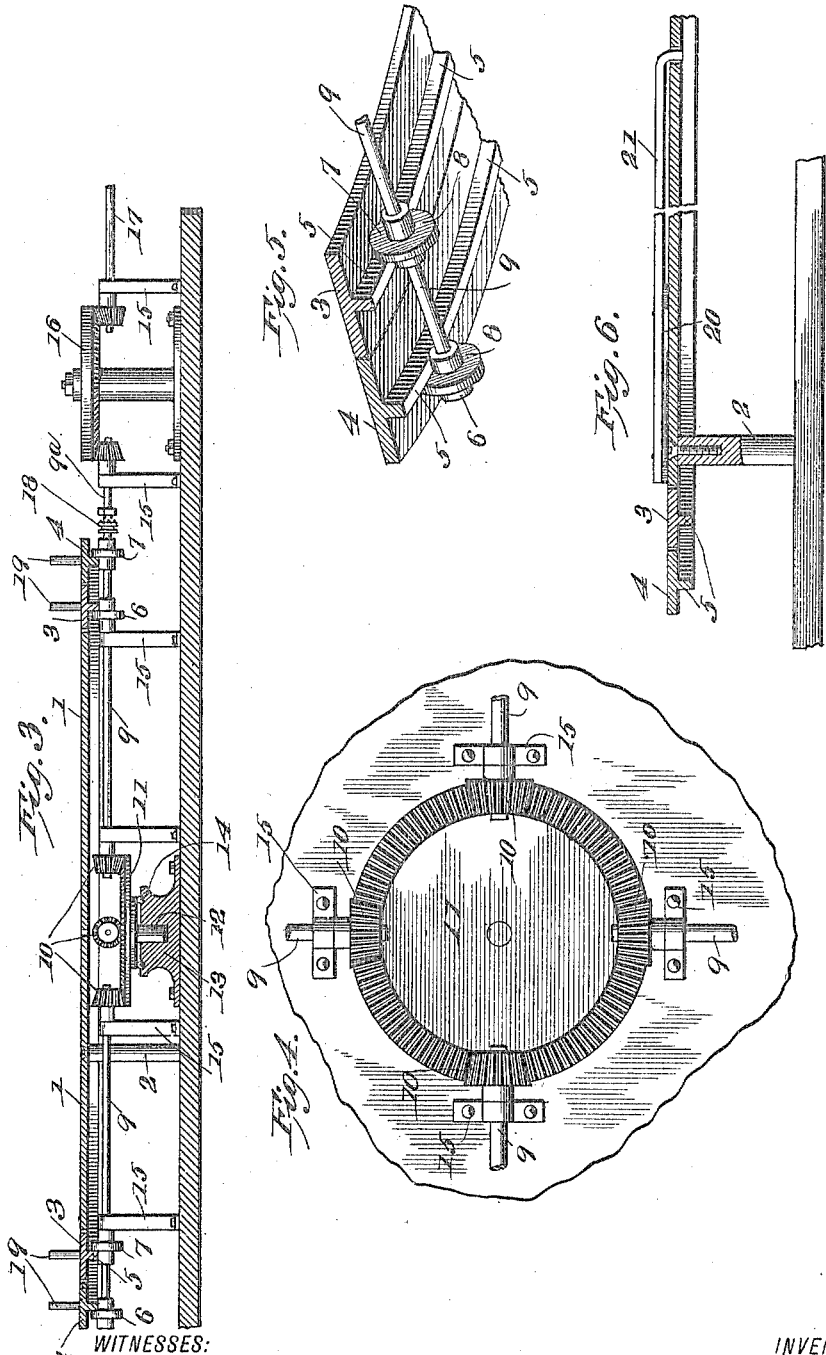
WITNESSES:
INVENTOR
JUAN L. ARIZTIA.
BY
ATTORNEYS

UNITED STATES PATENT OFFICE.

JUAN LUIS ARIZTIA, OF IQUIQUE, CHILE.

MERRY-GO-ROUND.

No. 820,901.   Specification of Letters Patent.   Patented May 15, 1906.

Application filed May 9, 1905. Serial No. 259,569.

*To all whom it may concern:*

Be it known that I, JUAN LUIS ARIZTIA, a citizen of Chile, residing at Iquique, in the Republic of Chile, have made certain new and useful Improvements in Merry-Go-Rounds, of which the following is a specification.

My invention is an improvement in that class of apparatus ordinarily designated as "merry-go-rounds" or "carousels" and which include a circular rotatable platform carrying horses or other quadrupeds intended and adapted to be ridden by persons using the apparatus. I have devised an improvement in which a series of annular platforms or rails is substituted for the ordinary rotatable platform, the same being supported and adapted to travel circularly on flanged rollers fixed on horizontal shafts radiating and driven from a common center.

The details of construction, arrangement, and operation are as hereinafter described, and illustrated in the accompanying drawings, in which—

Figure 1 is mainly a plan view of my improved apparatus, a portion being broken away to show the details of construction and arrangement. Fig. 2 is a side view of a portion of one of the annular traveling rails and a vertical post attached thereto and supporting a quadruped arranged for riding. Fig. 3 is a central vertical section of the apparatus. Fig. 4 is a plan view illustrating the arrangement of the central gearing of the apparatus. Fig. 5 is a sectional perspective illustrating the construction and arrangement of the flanged annular rails in connection with the flanged rollers upon which they are supported and by which they are caused to travel. Fig. 6 is a detail vertical section illustrating the relation of the annular rails to a fixed platform and the supports for the latter.

As will be understood by reference to Figs. 1 and 3, a horizontal fixed platform 1 is supported upon vertical posts 2. (See also Fig. 6.) Exterior to and concentric with this platform I arrange a series of, preferably two, circular movable rails or platforms 3 and 4, the same being flush with the fixed platform 1 and provided with pendent flanges 5, (see Fig. 5,) that run on rollers 6 and 7, having annular flanges 8, which are arranged on opposite sides of the flanges 5, attached to the rails 3 4. The rollers 6 7 are mounted fast upon shafts 9, which, as shown in Figs. 1 and 3, are arranged radially with reference to a common center and provided with bevel-gears 10, meshing with a master-wheel 11. The latter is provided with a pendent stub-shaft 12, (see Fig. 3,) which enters a socket in a base-piece 13, antifriction-balls 14 being preferably arranged between the parts 11 13, as shown. The several radial shafts 9, carrying the rollers 6 7, as before stated, are supported in suitable bearings 15, consisting of vertical posts secured upon a suitable foundation. For driving the central or master gear 11 I provide one of the shafts 9 with an extension $9^a$, (see Figs. 1 and 3,) which is geared with a motor-shaft in any suitable manner. In this instance I illustrate a large driving-gear 16 and a motor-shaft 17, the said gear being interposed between the shafts $9^a$ and 17, as will be readily understood. A clutch 18 of any suitable construction is applied for connecting and disconnecting the short shaft $9^a$ and the shaft 9, which is alined with it.

It will now be understood that if the motor-shaft 17 be set in rotation through the medium of the gear 16, the shaft $9^a$, and the alined shaft 9, clutched thereto, the central master-gear 11 will be rotated correspondingly, and thus the three other radial shafts 9 will be caused to rotate. Since the annular rails or platforms 3 4 are supported upon and held in place by the flanged rollers 5, applied to the several shafts 9, they will be carried or driven by reason of the rotation of said rollers and at different speeds, owing to the fact that the rail 3 is of less diameter than the rail 4. A certain momentum being acquired by the means described, the rails 3 4 may be released from the motor by operating the clutch 18 and left to travel until their momentum is expended.

Each of the rails 3 4 is provided with a series of vertical posts 19, (see Figs. 1, 2, 3,) and upon these posts horses or other quadrupeds or animals or receptacles for carrying persons are detachably supported—that is to say, the posts 19 are adapted to enter sockets formed in the body of the dummy animal or receptacle, such as a sleigh-body, which may be substituted therefor. By making the animals or receptacles detachable I provide for convenient change or removal of the same as conditions may require, also for storage or transportation of the apparatus.

A prominent feature of the apparatus and one conducing greatly to the amusement and interest derived by and awakened in the riders is the uncertainty at what point the respective rails 3 4 and the animals or receptacles carried thereby will be arrested or stopped. Thus at each post 19 a line is drawn transversely across the face or top of each rail 3 4, and upon the fixed platform 1 I arrange a movable stop-indicator consisting of a quadrilateral plate 20 and a radial arm 21, having a terminal claw or hook that enters a hole in the center of the platform 1. This device may be shifted around on the platform 1 and left at any point which may be selected or desired. When the rails 3 4 stop travel or rotation, that one of the animals supported thereby which is opposite the indicator 20 is declared the winner. Thus, as shown in Fig. 1, a horse is indicated opposite the plate or card 20, and consequently the boy or other person riding the horse will be declared the winner of the contest. If it chances that two horses and riders come opposite the card 20 when the travel of the rails 3 4 stops, that horse will be declared the winner which is nearest the front end or corner of the plate 20. The length of the latter is such relative to the distance between the posts 19 that two horses on the same rail cannot be within the limits of the length of the plate at the same time.

It is to be understood that in the case of a quite large apparatus or one whose platform has a large radius it may be necessary to provide supplemental roller-supports for the flanged rails 3 4 at points intermediate of the shaft 9. This feature is, however, not a matter of invention, and it is therefore unnecessary to illustrate it.

What I claim is—

1. The improved apparatus for the purpose specified comprising a driving-shaft, a master-gear driven thereby, a series of shafts geared with the master-gear and radiating therefrom, flanged rollers keyed on the several radial shafts equidistantly from the common center, and annular rails having pendent base-flanges resting upon and held in place by the aforesaid flanged rollers, substantially as described.

2. The improved apparatus for the purpose specified comprising a central master-gear, a series of shafts geared therewith and radiating therefrom and each provided with flanged rollers spaced apart, annular rails having pendent flanges that travel on and are held in place by the said flanged rollers, and provided with a series of posts for supporting dummy animals, a driving-shaft, and means for detachably connecting it with one of the aforesaid radial shafts, substantially as described.

3. An apparatus for the purpose specified, comprising a central master-gear and a series of radial shafts operatively geared therewith and provided with rollers arranged equidistantly from the common center, and an annular platform or rail supported upon and adapted to be driven by the several rollers, substantially as described.

4. An apparatus for the purpose specified, comprising a fixed circular platform, a driving-gear arranged centrally thereof, a series of radial shafts having rollers on their outer ends, the same being spaced apart, a series of annular rails traveling on said rollers and provided with a series of vertical posts, and a shiftable stop-indicator comprising a plate and a radial arm pivoted to the center of the fixed platform and adapted for use in the manner described.

5. In an apparatus for the purpose specified, the combination, with a suitable central support, a series of annular rails arranged exterior to and concentric with such support, means for supporting said rails and causing them to travel, and a stop-indicator pivotally connected with said support so that it is adapted to be shifted around the center thereof, and comprising a laterally-extended portion and a radial arm, substantially as described.

JUAN LUIS ARIZTIA.

Witnesses:
SOLON C. KEMON,
AMOS W. HART.